Aug. 11, 1925.
R. L. HUCKEBA
COTTON CHOPPER
Filed Aug. 23, 1924     4 Sheets-Sheet 1
1,548,884
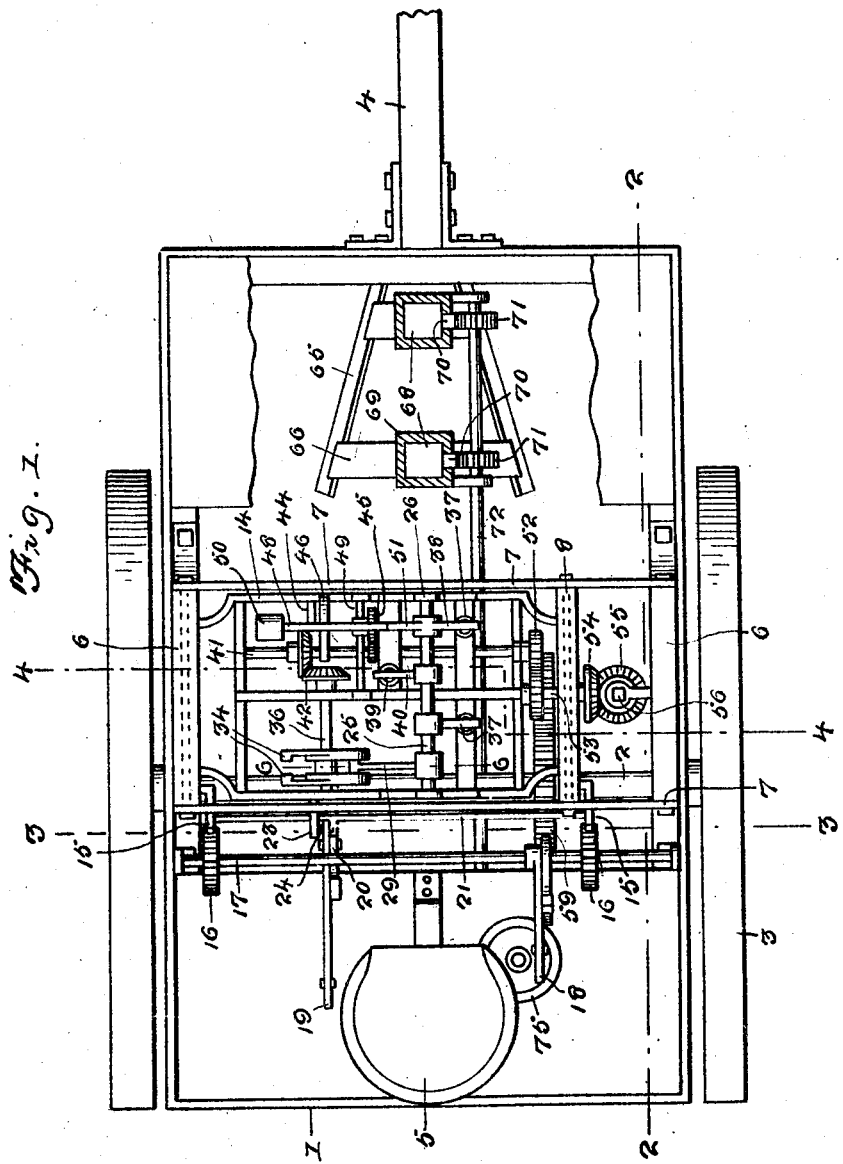
WITNESS:
E. P. Ruppert.
R. L. Huckeba
INVENTOR
BY Victor J. Evans
ATTORNEY

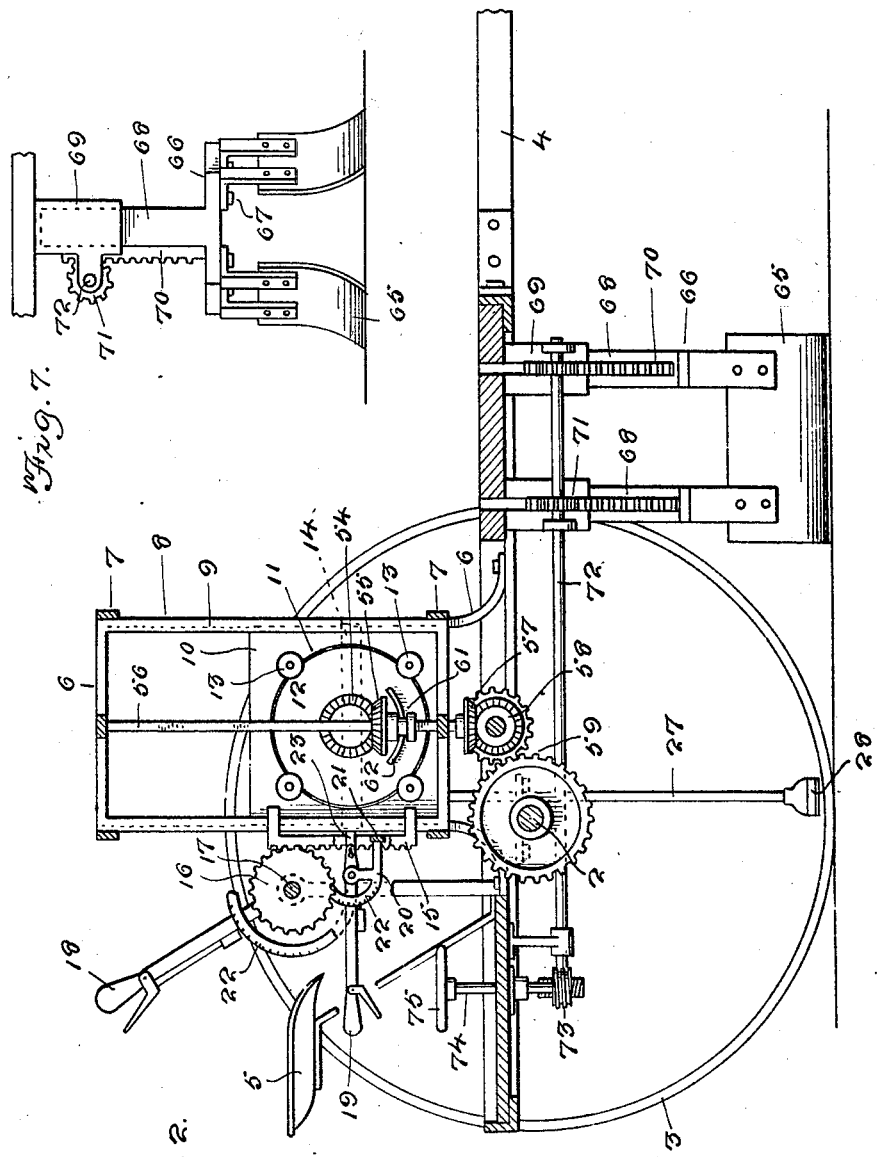

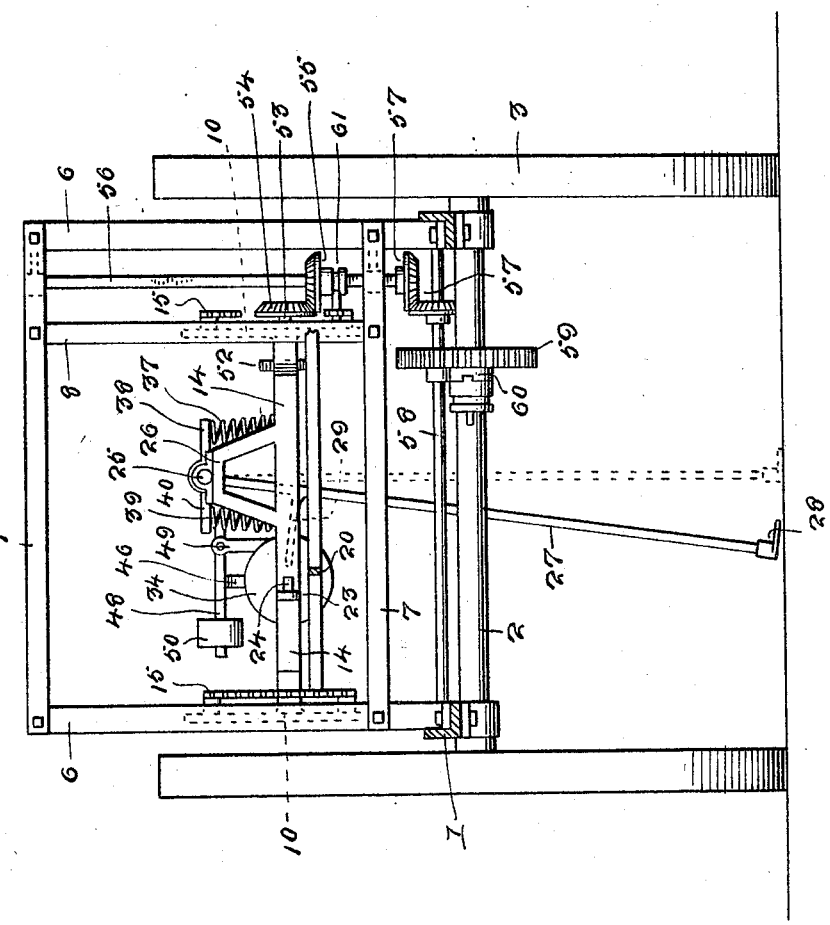

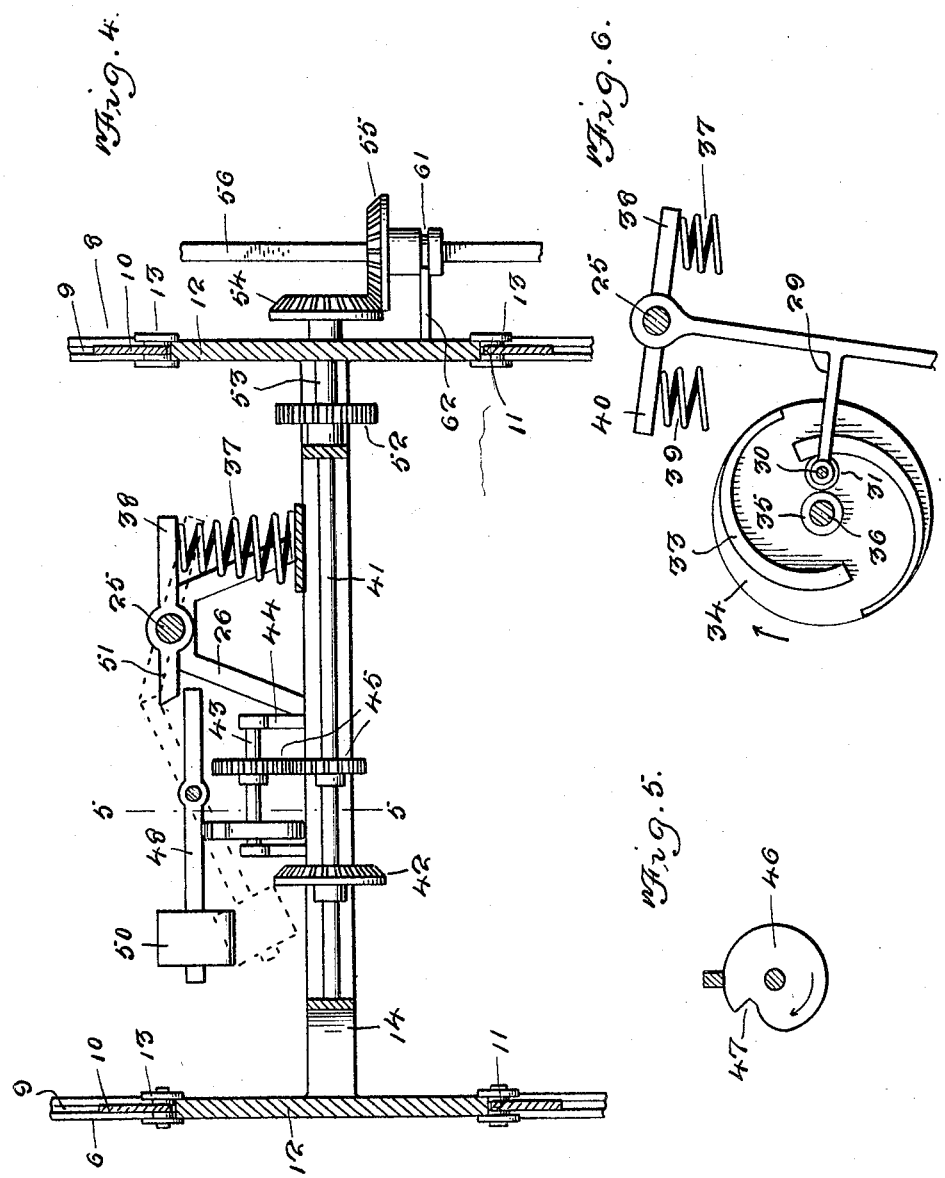

Patented Aug. 11, 1925.

1,548,884

UNITED STATES PATENT OFFICE.

ROBERT LEE HUCKEBA, OF ARAGON, GEORGIA.

COTTON CHOPPER.

Application filed August 23, 1924. Serial No. 733,770.

*To all whom it may concern:*

Be it known that I, ROBERT L. HUCKEBA, a citizen of the United States, residing at Aragon, in the county of Polk and State of Georgia, have invented new and useful Improvements in Cotton Choppers, of which the following is a specification.

This invention relates to an agricultural implement which is mainly designed for "chopping" cotton, the general object of the invention being to provide a wheeled frame to which a hoe is pivoted, with spring means for giving the hoe its chopping stroke and power means for compressing the spring means and for returning the hoe to its starting point, and means for preventing a chopping stroke at intervals so that the device will cut some of the plants from a row of plants, thus acting to thin the plants in a row.

Another object of the invention is to porvide means whereby the operator can raise the hoe and its operating means so that the implement can travel along roads and across fields without the hoe contacting with objects.

A further object of the invention is to provide means whereby the hoe can be tilted forwardly or rearwardly by the operator so as to miss plants that the operator thinks should remain in the row and prevent the hoe from striking stumps, stones and other objects.

Another object of the invention is to provide plows at the front of the implement for cutting out grass and weeds from between the rows.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a plan view of the device.

Figure 2 is a section on line 2—2 of Figure 1.

Figure 3 is a section on line 3—3 of Figure 1.

Figure 4 is a section on line 4—4 of Figure 1.

Figure 5 is a section on line 5—5 of Figure 4.

Figure 6 is a detail view of the cam means for operating the hoe and compressing the springs.

Figure 7 is a detail front view of the plows at the front of the implement.

In these views, 1 indicates a frame which is mounted on the axle 2 to which the wheels 3 are connected, this frame being provided with the usual tongue 4 so that the device can be pulled by a team of horses or by a tractor. The frame is provided with the usual seat 5 for the operator, and the frame supports a pair of upright castings 6 of substantially rectangular shape. Cross pieces 7 are secured to these castings and a third casting 8 is secured to these cross pieces. Guideways 9 are formed in the vertical pieces of the castings 8 and one of the castings 6 and bearing plates 10 are arranged to slide in these guideways. Each bearing plate is provided with a circular opening 11 in which fits a disc 12 and the disc engages rollers 13 carried by each plate 10. Thus the discs are rotatably supported by the plates 10. A horizontal frame 14 has its ends connected with the discs 12. A rack 15 is attached to each plate 10 and each rack is engaged by a toothed wheel 16, the wheels being mounted on a shaft 17 which is journaled in the frame and to which a hand lever 18 is connected, the hand lever being located adjacent the seat 5 so that the operator can rock the shaft to raise and lower the plates 10 through means of the toothed wheels and racks shown. A hand lever 19 is pivoted to a bracket 20 which is fastened to a cross bar 21 which has its ends connected with the racks 15 so that the lever and bracket are moved with the plates 10. The hand levers are provided with the usual quadrants 22, that for the lever 19 forming part of the bracket 20. The lever 19 is connected to a projection 23 on the horizontal frame 14 by a pin 24 which engages a slot in the lever. Thus by manipulating the lever 19 the horizontal frame can be rocked or tilted as the discs 12 to which the ends of the frame are connected are rotatably supported in the plates 10.

A shaft 25 is journaled in the uprights 26 on the frame 14 and this shaft has secured thereto the stem 27 of the chopping hoe 28. The stem is provided with an arm 29 which carries a small shaft 30 at its outer end which carries a pair of rollers 31. Each of these rollers engages the substantially crescent shaped cams 33 on a disc 34, the two discs being conected together by the hub 35 and a shaft 36 passes through the hub and is journaled in the horizontal frame. These parts are so arranged that when the discs are being rotated the cams acting on the rollers carried by the arm 29 will swing the hoe to the left, as shown in full lines in Figure 3, twice, during each revolution of the disc. A pair of coil springs 37, carried by the horizontal frame and engaging the arms 38, tends to rock the shaft in a direction to swing the hoe to the dotted line position in Figure 3 so that when the rollers leave the inner ends of the cams these springs, which are compressed by the outward movement of the hoe, under the action of the cams, will cause the hoe to snap forwardly until the rollers strike the small end of the second cam and thus the springs give the hoe its chopping stroke. A spring 39 engages an arm 40 on the shaft 25 and acts as a cushion to counter-act action of the springs 37. This spring 39 is much weaker than the combined strength of the springs 37. A shaft 41 is journaled in the horizontal frame 14 and this shaft is geared to the shaft 36 by the gears 42. This shaft 41 is also geared to a shaft 43 journaled in the upright 44 on the frame 14 by the gears 45 and this shaft 43 carries a cam disc 46 having a notch 47 therein which has a straight wall and a curved wall. A lever 48 is pivoted to an upright 49 on the frame 14 and has a weight 50 thereon. This lever rests upon the disc 46 and is held in horizontal position until the notch 47 comes under it when the weight 50 will cause the lever to drop into the notch and thus the lever will be tilted and its free end will engage the beveled end of an arm 51 on the shaft 25, as said shaft 25 is being rocked by the cams and thus the shaft 25 will be held in a position with the springs 37 under tension so that these springs cannot snap the hoe forwardly for its chopping action. Thus the hoe will be prevented from making its chopping stroke until the lever 48 is moved to its normal position by riding up the curved wall of the notch in disc 46. In this way the chopping action of the hoe is interrupted once every revolution of the disc 46 so that by causing said disc 46 to rotate at the desired speed, by using gears 45 of the proper size, the plants in a row can be thinned to the desired extent.

The shaft 41 is connected by the gears 52 with a stub shaft 53 which passes through the center of one of the discs 12 and which has a beveled gear 54 on its outer end. This gear meshes with a similar gear 55 which is slidably mounted on a square shaft 56 vertically arranged in the frame and which is connected at its lower end by the gears 57 with a shaft 58 journaled in the main frame of the device, and which is in turn connected by the gears 59 with the axle 2. The gear 59 on the axle 2 is provided with a clutch device 60 so that it can be disengaged from the axle whenever desired. The gear 55 has a groove 61 therein which is engaged by an arc-shaped projection 62 carried by one of the discs 12 so that said gear 55 will be moved with the disc as the parts are adjusted vertically by the lever 18. By making this projection of arc-shape it will not interfere with the tilting movement of the horizontal frame.

From the foregoing it will be seen that I have provided means whereby a hoe is given an oscillatory movement, the movement in one direction being imparted to the hoe by the cam means and in the other direction by the spring means, the springs snapping the hoe forwardly on its cutting stroke. The weighted lever operated by the notched disc stops the chopping action at intervals so that by regulating the speed of this device the row of plants can be thinned as desired. When the operator sees a plant which he thinks should remain in the row he may prevent this plant from being cut by the hoe by manipulating the lever 19 to tilt the horizontal frame which carries the hoe in either direction so that the hoe will miss the plant. The operator can do this also to cause the hoe to miss stones, stumps and other objects. When the hoe is not being used and it is desired to lift the same so that it will not strike objects the operator would lower the lever 18 so as to cause the toothed wheels and racks to raise the plates 10 which will also raise the hoe and its attached parts.

I arrange a pair of plows 65 at the front of the implement for cutting out weeds, grass and the like from between the rows of plants. These plows are adjustably connected with the cross pieces 66, as shown at 67, and these cross pieces are connected with the posts 68 which engage the depending socket pieces 69 on the frame. Racks 70 are connected with the post and are engaged by pinions 71 on a shaft 72 which is journaled in the main frame and which has its rear end connected by the worm gearing 73 with the vertical shaft 74 to which the hand wheel 75 is secured. Thus the operator can raise and lower the plows 65 as he desires. By means of the adjustment 67 the plows can be placed at the desired inclination.

While the device is mainly intended for chopping cotton it will of course be understood that it can be used for thinning rows of other plants.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. An implement of the class described comprising a wheeled frame, a cutting tool having its stem pivoted in the frame, power means for moving the tool towards one side of the implement, spring means for moving the tool towards the other side of the implement to give the chopping stroke, such spring means being tensioned by the first means, means for preventing the chopping stroke at intervals and manually operated means for tilting the tool either forwardly or rearwardly so as to miss a plant or other object.

2. An implement of the class described comprising a wheeled frame, a cutting tool having its stem pivoted in the frame, power means for moving the tool towards one side of the implement, spring means for moving the tool towards the other side of the implement to give the chopping stroke, such spring means being tensioned by the first means, means for preventing the chopping stroke at intervals, manually operated means for tilting the tool either forwardly or rearwardly so as to miss a plant or other object and manually operated means for raising the hoe and its operating means.

3. An implement of the class described comprising a wheeled frame, a cutting tool having its stem pivoted in the frame, power means for moving the tool towards one side of the implement, spring means for moving the tool towards the other side of the implement to give the chopping stroke, such spring means being tensioned by the first means, means for preventing the chopping stroke at intervals, manually operated means for tilting the tool either forwardly or rearwardly so as to miss a plant or other object, manually operated means for raising the hoe and its operating means and adjustable plows at the front of the implement for cutting weeds and grass from between the rows.

4. An implement of the class described comprising a wheeled frame, and an auxiliary frame, means for permitting said frame to be moved vertically and to be tilted, manually operated means for adjusting the frame, a rock shaft in the auxiliary frame, a hoe having its stem connected with the shaft, cam means, an arm on the stem engaging the cam means, springs, arms on the shaft engaging the springs, cam means acting to tension the springs as the shaft is rotated so that said spring will give the hoe its cutting stroke, a weighted lever engaging a part on the shaft for preventing the cutting action at intervals, a notched disc engaging the weighted lever for actuating the same and means for operating the cam means and the notched disc from one of the ground wheels.

5. An implement of the class described comprising a wheeled frame, including an upright part, plates vertically movable in the upright part, a disc rotatably mounted in each plate, a horizontal frame having its ends connected with the discs, manually operated means for moving the plates in the upright part, manually operated means for tilting the horizontal frame, a vertically arranged shaft in the upright part, means for rotating the same from one of the ground wheels, a gear slidably but non-rotatably mounted on the shaft, a projection on one of the discs engaging the gear to cause the same to move vertically with the disc while permitting the disc to be rocked, a longitudinally arranged shaft in the auxiliary frame, a hoe having its stem connected with the shaft, springs supported by the auxiliary frame, arms on the hoe shaft for engaging the springs so that the shaft and hoe are held in one position by the springs, cam means engaging a part on the stem for moving the hoe and rocking the shaft to tension the springs so that the springs will give the hoe its chopping stroke when the cam means releases the same, a bumper spring for the parts, means for preventing the chopping stroke of the hoe at intervals, a shaft in the auxiliary frame, gears connecting the same with the last mentioned means and with the cam means, a stub shaft passing through one of the discs, gearing connecting the same with the last mentioned shaft and a gear on the stub shaft engaging the gear on the vertical shaft.

In testimony whereof I affix my signature.

ROBERT LEE HUCKEBA.